UNITED STATES PATENT OFFICE.

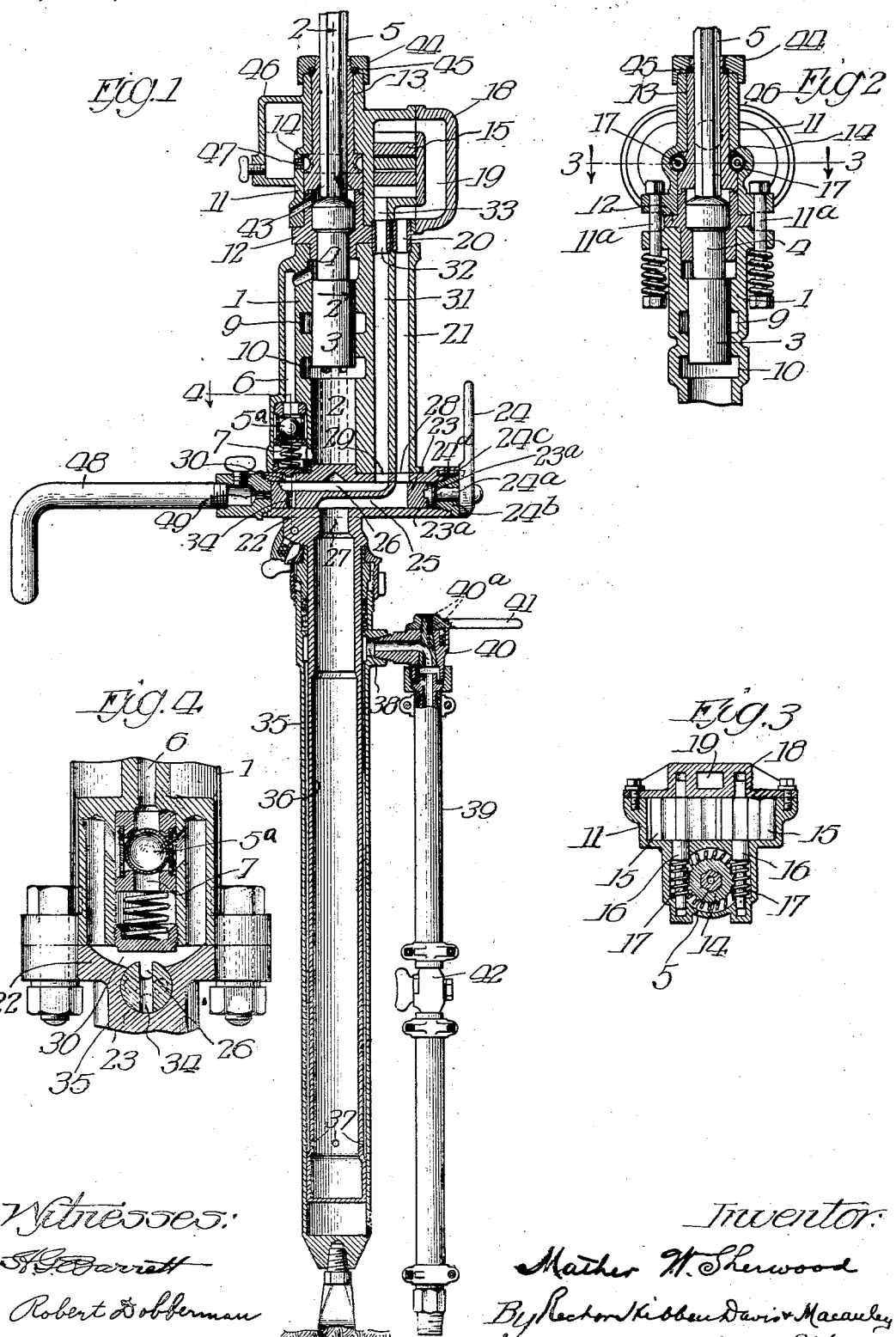

MATHER W. SHERWOOD, OF FRANKLIN, PENNSYLVANIA, ASSIGNOR TO CHICAGO PNEUMATIC TOOL COMPANY, OF CHICAGO, ILLINOIS, A CORPORATION OF NEW JERSEY.

DRILLING-MACHINE.

1,161,259.  Specification of Letters Patent.  Patented Nov. 23, 1915.

Application filed March 12, 1914. Serial No. 824,082.

*To all whom it may concern:*

Be it known that I, MATHER W. SHERWOOD, a citizen of the United States, residing at Franklin, Venango county, Pennsylvania, have invented certain new and useful Improvements in Drilling-Machines, of which the following is a specification.

My invention relates to a drilling machine and the object thereof is to provide a simple, efficient and reliable machine of this character characterized by air feed mechanism and engine and rotatable drill chuck mechanism under the control of a single valve capable of supplying the motive fluid direct to the drilling engine or indirectly thereto by first passing the motive fluid through the mechanism for rotating the drill chuck. In the present instance the motive fluid first passes through the air feed mechanism for extending the length of the drilling machine and for feeding the drill to its work.

In the drawing, Figure 1 is a central longitudinal section of my drilling machine; Fig. 2 a section on the line 2—2 of Fig. 1; Fig. 3 a section on the line 3—3 of Fig. 2; and Fig. 4 a section on the line 4 of Fig. 1.

In the present instance I have shown my invention embodied in that type of drilling machine known as a "stoper" but it will be understood that such invention is not limited to such particular type but that I contemplate using my invention wherever applicable. However, for convenience my invention will be described in connection with this particular type of machine but without intention of limitation thereto.

The drilling machine comprises the following several parts or mechanisms, first, the drilling engine which may be of any suitable construction, second, the mechanism for rotating the drill chuck which may be of any desired construction but preferably of the construction and operation shown, third, the air feed mechanism which is of suitable construction but preferably of the telescoping cylinder type, and fourth, a block or head forming the back head of the drilling engine and also of the air feed mechanism and containing a valve for controlling the admission of the motive fluid to the drill chuck operating mechanism and to the drilling engine.

The drilling engine comprises a cylinder 1 having a piston chamber 2 in which reciprocates the piston 3 adapted to impart its blows to an impact piece or anvil 4 which in turn imparts its blows to the angular drill steel 5. The motive fluid is admitted to opposite ends of the piston chamber by means of a suitable distribution valve which is here in the form of a ball valve 5ª governing the port and passage 6 leading to the front end of the piston chamber and the ports and passages 7 and 8 leading to the rear end of the piston chamber. The exhaust is controlled by the piston itself through the two exhaust grooves 9 and 10.

The drilling engine is provided at its front end with a front head 11 between which and the front end of the cylinder is interposed a bushing 12 within which the impact piece 4 is located. This front head is interiorly fashioned so as to form a tubular bearing for a rotatable drill chuck 13 which has an angular central bore to receive the drill steel 5. The inner end of this drill chuck is of enlarged diameter and formed as a worm gear 14. The front head and the interposed bushing are held onto the front end of the cylinder in suitable manner as by means of the bolts 11ª engaging respectively the cylinder and said front head.

The drill chuck operating mechanism comprises a pair of similar intermeshing gears or rotors 15 secured to the two similar parallel shafts 16 bearing in the front head, as shown in Fig. 3, and provided at one end with or formed as worms 17. These worms mesh with the worm gear 14 with the result that the rotation of the rotors in opposite directions rotates the worm gear and consequently the drill chuck. The rotors are located in a casing formed on the front head and closed by a cap 18 which contains the motive fluid passage 19 which in turn communicates through the hollow dowels 20 with a motive fluid supply passage 21. The supply of the motive fluid through these ports and passages and the means for governing the same will be hereinafter described.

The rear end of the engine cylinder is closed by means of a back head or block 22 secured or clamped thereto in any desired manner. This back head also forms a head for the air feed mechanism hereinafter explained. This back head has a central longitudinal bore forming a tubular chamber to receive the cylindrical throttle valve 23 which is operated by means of a handle 24 removably connected with one end of the valve. This valve has two main ways or passages 25 and 26, the former being adapted to connect between a port 27 in the back head and on one side of the valve chamber and a port 28 also in said back head but on the other side of the valve chamber, the latter port communicating with the passage 21. The other passage 26 is adapted to communicate between the port 29 and the supply ports 30 in the back head, the port 29 communicating through the passage 31 and the hollow dowel 32 with the exhaust port 33 of the fluid pressure mechanism operating the drill socket. In addition the plug valve 33 is provided with a transverse port 34 for the purpose of admitting the motive fluid from the passage 26 to the port 30 and to the valve mechanism of engine when the valve 23 is turned 180 degrees from the position shown in Fig. 1, at which time said passage 26 will be in direct communication with the port 27.

The air feed mechanism comprises two telescoping cylinders 35 and 36, the former being the inner one and formed as a part of or rigidly secured to the back head and the former being the inner and movable one and adapted to slide along the inner surface of the inner cylinder or tube. This inner cylinder is closed at its outer end but provided with a series of ports 37 through which the motive fluid is adapted to flow from the space between the two cylinders, thence through the interior of the inner cylinder to the port 27. The motive fluid communicates with the outer cylinder through a port 38 to which is connected the motive fluid supply pipe 39 having throttle valve mechanism 40 controlled by the handle 41 and also having a shut-off valve 42.

Describing the operation of the drilling machine and assuming that the parts are in the relative position shown in Fig. 1, the motive fluid is admitted through the valve 40 to the air feed mechanism and flows therethrough to the port 27. It then passes through the ports and passages 25, 28, 21, 20 and 19 to the fluid pressure mechanism for operating the drill socket and rotates the two rotors 15 in passing through the casing in which they are located. The exhaust from this fluid pressure mechanism then passes to the drilling engine and operates the same, the course of the motive fluid being through the ports 33, 32, 31, 29, 26 and 30 to the distribution valve mechanism which controls the admission of such fluid to opposite ends of the piston chamber 2. The operation of the rotors rotates the drill chuck 13 and the drilling engine is operated by the exhaust from these rotors.

When the valve 23 is in the position shown in Fig. 1, the motive fluid is admitted to the drilling engine only indirectly, that is, through the rotors, but if desired the rotors may be cut out of operation and the motive fluid admitted direct to the drilling engine by turning the valve 23 180 degrees whereupon the motive fluid will be admitted directly from the port 27 through the ports and passages 26, 34 and 30 to the valve mechanism.

It will be understood of course that when the motive fluid is admitted to the air feed mechanism the drilling machine is extended by the extension of the telescoping cylinders in order to position the machine and the drill will thereafter be fed to its work by these telescoping cylinders. It will also be understood that I refer to these cylinders as "air" feed mechanism because the motive fluid generally employed is compressed air. The air feed device is provided with means for releasing the motive fluid therein at the completion of the work and thereby allowing the machine and drill to be withdrawn. In the present instance such means consists of a small vent or leak passage 40$^a$ in the valve 40 which is a three-way valve. This vent establishes communication between the feed cylinder and the atmosphere in the shut-off position of the valve.

In practice it is preferred to first operate the drill engine without any chuck rotation in order that the drill may get a start in the rock before the drill rotation begins. It is obvious that in starting the machine against a rock surface which is uneven or slanting it is desirable to have the chuck rotation inoperative in order that the drill bit shall not travel about on the surface of the rock as would be liable to be the case if rotary motion were imparted to it at that time. In order to accomplish this result and at the same time bring the controlling means within convenient reach of the operator, the two-function valve 23 is arranged at the central portion of the machine and is constructed to permit of initial or direct operation of the drilling engine alone or the simultaneous operation of the engine and the drill chuck motor as circumstances require.

The controlling valve 23 and its operating handle 24 are preferably constructed in the manner illustrated in Fig. 1 according to which such handle has a stem 24$^a$ with an inner flanged head interlocking with one end of the valve 23. This stem passes through a plug 24$^b$ screwing into one end of the valve chamber and the same is held in locked position with respect to such chamber by means of the spring pressed pin 24$^c$ which passes through one of a series of holes through the rim of the plug and into a hole in the adjacent tubular portion of the plug 22. The handle 24 has on its inner side three recesses into which the pin 24$^c$ is adapted to be projected in order to determine or locate the different operative positions and neutral position of the valve 23. By preference a washer 23$^a$ of fibrous or resilient material is interposed between the head of the stem 24$^a$ and the inner end of the screw plug. The spring 24$^d$ together with the fluid pressure in the valve chamber act to hold the head of the stem against the washer, which in turn, is held against the screw plug.

Inasmuch as stoping drills are used in an upward direction chips and cuttings necessarily fall upon the upper end of the machine where the drill steel or bit is inserted and because of the more or less loose fit at this point the chips and cuttings find their way down to the impact piece or anvil 4. It is necessary to provide an outlet therefor and consequently I provide one or more holes 43 which in the present instance pass through the front head and also through the front end of the bushing 12. Inasmuch as the hollow dowels 20 and 32 compel the proper location of the front head and prevent bushing 12 from turning it follows that the holes through the front head and bushing must register and thereby provide the necessary outlets.

In order to minimize as much as possible the entrance of the chips and cuttings at the front or upper end of the machine I prefer to provide a cap 44 which screws upon the extended front end of the drill chuck and which extends over and partially surrounds the front end of the head 11 so as to shed or deflect the chips and cuttings and prevent them from entering the bearing between the front head of the rotating sleeve. By preference a locking nut 45 is provided on the extended end of the drill chuck to assist in keeping the cap 12 in place.

My drilling machine is also provided with an oil reservoir 46 which is provided with a minute passage 47 for supplying the oil directly to the worms and worm gear. In addition the machine is provided with a reservoir formed by the hollow handle 48, the oil passing through a minute passage 49 to one end of the valve 23.

It will be understood that when the valve 23 is in a 90° position with respect to that illustrated, it closes all passages for supplying the motive fluid to the engine, this being the proper position for the valve before the motive fluid is applied to extend the feed cylinders.

I claim:

1. In a drilling machine, the combination of a drilling engine including a rotatable drill chuck, fluid pressure operated mechanism for driving the chuck, fluid pressure feed mechanism for the engine, means for feeding motive fluid initially to the latter mechanism, and means for conducting the motive fluid from such mechanism to the drill chuck operating mechanism and thereupon to the drilling engine.

2. In a drilling machine, the combination of a drilling engine including a rotatable drill chuck, fluid pressure operated mechanism for driving the chuck, fluid pressure feed mechanism for the engine, a block interposed between the engine and the feed mechanism and having a valve-chamber with ports communicating with such mechanism and also with the engine and the drill chuck operating mechanism, and a valve in said chamber coöperating with said ports and arranged to admit the motive fluid first to the drill chuck operating mechanism and thence to the engine or direct to such engine.

3. In a drilling machine, the combination of a drilling engine including a rotatable drill chuck, fluid pressure operated mechanism for driving the chuck, fluid pressure feed mechanism for the engine, a block interposed between the engine and the feed mechanism and having a valve-chamber with ports communicating with such mechanism and also with the engine and the drill chuck operating mechanism, and a cylindrical valve in said chamber provided with passages coöperating with said ports and arranged to admit the motive fluid first to the drill chuck operating mechanism and thence to the engine or direct to such engine.

4. In a drilling machine, the combination of a drilling engine including a rotatable drill chuck, fluid pressure operated mechanism for driving the chuck, fluid pressure feed mechanism for the engine, a block interposed between the engine and the feed mechanism and having a valve chamber with ports communicating with such mechanism and also with the engine and the drill chuck operating mechanism, and a cylindrical valve in said chamber provided with two opposite longitudinal passages 25 and 26, the passage 25 being arranged to connect between the feed mechanism and the drill chuck operating mechanism and the passage 26 between such latter mechanism and the engine.

5. In a drilling machine, the combination of a drilling engine including a rotatable drill chuck, fluid pressure operated mechanism for driving the chuck, fluid pressure feed mechanism for the engine, a block interposed between the engine and the feed mechanism and having a valve chamber with ports communicating with such mechanism and also with the engine and the drill chuck operating mechanism, and a cylindrical valve in said chamber provided with two opposite longitudinal passages 25 and 26 and a transverse passage 34 communicating with passage 26, the passage 25 being arranged in one position of the valve to connect between the feed mechanism and the drill chuck operating mechanism and the passage 26 between such latter mechanism and the engine, and the passages 26 and 34 in another position of the valve to connect directly between the feed mechanism and the engine.

6. In a drilling machine, the combination of a drilling engine including a rotatable drill chuck, fluid pressure operated mechanism for driving the chuck, fluid pressure feed mechanism for the engine, comprising telescoping cylinders having an inlet for admitting the motive fluid supplied thereto and eventually to the drill chuck mechanism and the engine, and valve mechanism interposed between the feed mechanism and the drill chuck mechanism and the engine for controlling the motive fluid to the drill chuck mechanism and thence to the engine or direct to the engine, cutting out the drill chuck mechanism.

7. In a drilling machine, the combination of a drilling engine including a rotatable drill chuck, fluid pressure operated feed mechanism for the engine, a throttle valve for controlling the admission of motive fluid directly to the feed mechanism and having a vent which is open to atmosphere when the valve is closed, and means for conducting the motive fluid from such mechanism to the drill chuck operating mechanism and therefrom to the drilling engine.

8. In a drilling machine, the combination of a drilling engine including a rotatable drill chuck, fluid pressure operated mechanism for driving the chuck, and means for feeding motive fluid either direct to the engine or indirectly through the drill chuck mechanism, such means including a block 22 connected with the engine and having a valve chamber, a valve 23 therein, a plug at one end of the chamber, a handle having a stem passing therethrough and connected with the valve, and a spring pressed pin 24 passing through the plug and entering the block and adapted to coöperate with said handle to locate different positions thereof.

MATHER W. SHERWOOD.

Witnesses:
 JNO. B. WILLIAMS,
 HATTIE B. HEPNER.